US00H002281H

(19) United States
(12) Statutory Invention Registration
Bell et al.

(10) Reg. No.: US H2281 H
(43) Published: Sep. 3, 2013

(54) APPARATUS AND METHOD FOR TESTING AN EDGE OF A WORKPIECE FOR SHARPNESS

(75) Inventors: Larry Bell, Winterville, NC (US); Stefan Kunzmann, Walzbachtal (DE); Phillip Montanye, New Bern, NC (US)

(73) Assignee: BSH Home Appliances Corporation, New Bern, NC (US)

(21) Appl. No.: 12/925,279

(22) Filed: Oct. 18, 2010

(51) Int. Cl.
*B23Q 17/20* (2006.01)

(52) U.S. Cl. ..... 73/104
(58) Field of Classification Search ..... 73/104, 73/105
See application file for complete search history.

(56) References Cited

U.S. PATENT DOCUMENTS

2012/0090390 A1 * 4/2012 Bell et al. ..... 73/104

* cited by examiner

*Primary Examiner*—Daniel Pihulic

(74) *Attorney, Agent, or Firm*—James E. Howard; Andre Pallapies

(57) ABSTRACT

An apparatus for testing an edge of a workpiece for sharpness includes a body, a probe extending outwardly and pivotably mounted from the body, the probe is biased in a direction for placement against an edge of a workpiece with a predetermined force, a test head on a distal end of the probe for mounting test tape for physical contact with an edge as a test medium, a test point for mounting to the workpiece, and a continuity circuit mounted to the body in electrical communication with the test head and the test point for providing a predetermined electrical current between the test head and the test point through the workpiece when the test tape is cut sufficiently by the workpiece to allow the test head to touch the workpiece to form a complete circuit.

20 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Fig. 3
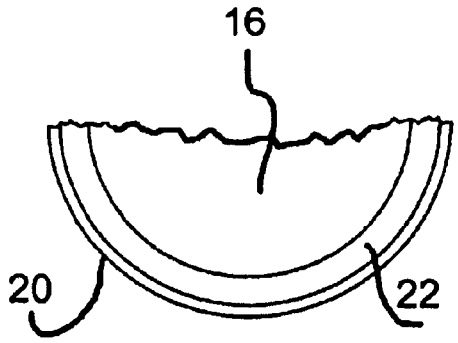
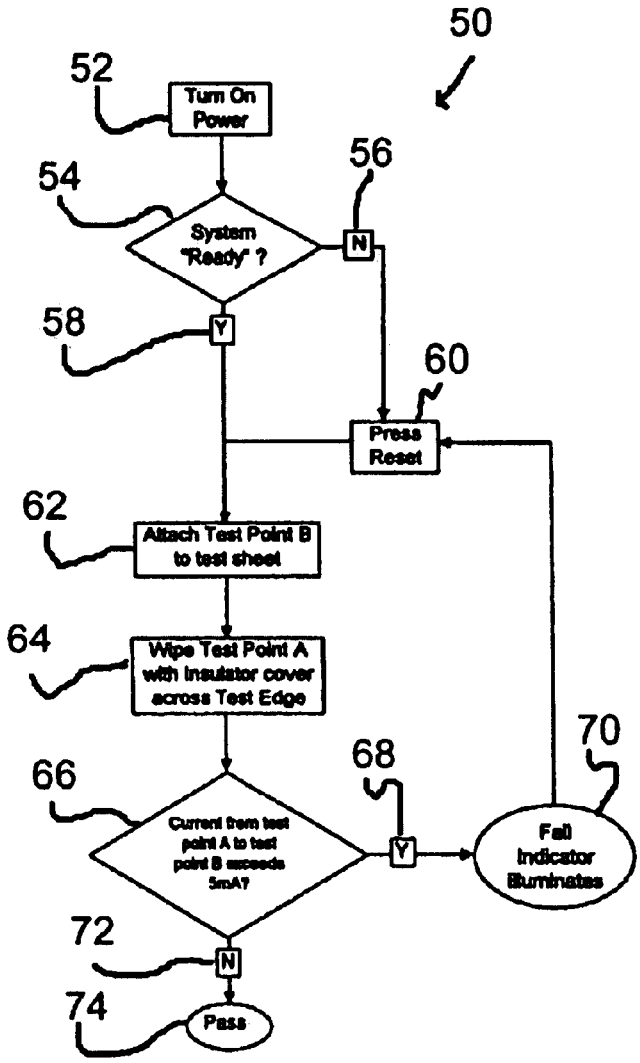
Fig. 4

APPARATUS AND METHOD FOR TESTING AN EDGE OF A WORKPIECE FOR SHARPNESS

BACKGROUND OF THE INVENTION

The present invention relates broadly to apparatus and methods for the nondestructive testing of workpieces, equipment, and other industrial items. More particularly, the present invention relates to an apparatus for testing the sharpness of edges of workpieces comprised in household appliances and other consumer goods.

Various hardware and equipment such as appliances and other such consumer goods often comprise workpieces formed from metal. Such metal workpieces are configured into shapes having edges that may be considered sharp and, for example, when such workpieces with sharp edges are comprised in a household appliance, the sharp edges may snag the clothing of a person using the household appliance. Thus, it is known to use a sharp edge test apparatus to assess the degree of sharpness of sharp edges associated with household appliances or other equipment.

Underwriters Laboratories, which is an independent, not-for-profit product safety certification organization that tests products, has promulgated a test for testing edge sharpness in an effort to encourage a uniform standard for edge sharpness. This test for testing edge sharpness promulgated by Underwriters Laboratories is denominated Test For Sharpness Of Edges On Equipment and has been made available as UL Form 1439 ("UL 1439") (ISBN 0-7629-0275-2). A general test apparatus specified by Underwriters Laboratories for performing a test for testing edge sharpness includes two sensing tapes layered on top of an indicating tape to provide a three-layer tape arrangement on the test head of the sharp edge test apparatus. The sharp edge test apparatus uses an arm to support the test head and the arm is spring-biased to apply a predetermined force to the edge of the appliance as it is moved therealong and, if the tape is cut, an analysis is conducted and a subjective determination made whether or not the edge has sufficiently cut the tape to render the edge dangerous and therefore fail the test. A test apparatus having a sensing tape carried on a test head is available from Excellent Technology Co. of Hong Kong and features removable test heads to speed up ongoing testing operations.

While a test for testing edge sharpness such as the test just described may yield useful results, tests of this type involving a visual observation by a test performer that the sensing tape has been cut disadvantageously bring with them an element of subjective interpretation—namely, a subjective interpretation by the test performer as whether a sensing tape has, in fact, been cut or has not been cut. It would therefore be desirable if a test for testing edge sharpness could be performed that diminishes, if not entirely eliminates, the necessity for a test performer to subjectively interpret the test results as to whether a sensing tape has been sufficiently cut or not cut when deployed during a test for testing edge sharpness.

SUMMARY OF THE INVENTION

In accordance with the recognition brought forth by the present invention that it would be desirable if a test for testing edge sharpness could be performed that diminishes, if not entirely eliminates, the necessity for a test performer to subjectively interpret the test results as to whether a sensing tape has been sufficiently cut or not cut when deployed during a test for testing edge sharpness, it is accordingly an object of the present invention to provide an edge test apparatus that diminishes the necessity for a test performer to subjectively interpret test results as to whether a sensing tape has been sufficiently cut or not cut when deployed during a test for testing edge sharpness.

It is accordingly an additional object of the present invention to provide an edge test apparatus which provides an instant response to an edge test.

It is another object of the present invention to provide such an edge test apparatus which provides an objective test regarding the sharpness of the edge.

It is a further object of the present invention to provide such an edge test apparatus that maybe readied for use in a manner more rapid than the prior edge test apparatus.

To those and other ends, the present invention is directed to an apparatus for testing an edge of a workpiece for sharpness including a body; a probe extending outwardly from the body and pivotably mounted thereto, the probe being biased by biasing means in a direction for placement against an edge of a workpiece with a predetermined force; a test head disposed on a distal end of the probe for mounting test tape for physical contact with an edge as a test medium; a test point for mounting to the workpiece; and a continuity circuit mounted to the body in electrical communication with the test head and the test point for providing a predetermined electrical current between the test head and the test point through the workpiece when the test tape is cut sufficiently by the workpiece to allow the test head to touch the workpiece to form a complete circuit and thereby use electrical continuity as an indication of an excess of edge sharpness.

Sharpness is a difficult concept to quantify. There are no units for sharpness, yet different degrees of sharpness exist, to the extent that there can be an excess, if a predetermined standard is set for acceptable sharpness. UL 1439 sets forth the criteria for determining whether an edge has become unacceptably, therefore excessively sharp. Accordingly, with such parameters set, "an excess of edge sharpness" is a definite, measurable parameter.

Preferably, the apparatus further includes a continuity indicator to provide an indication that electrical continuity has been achieved during a test, thereby indicating excess edge sharpness. It is preferred that the continuity circuit be configured such that a current of at least 5 mA is considered continuity for the purposes of an indication of excess edge sharpness, and more specifically, the continuity circuit is configured such that a current of 5 mA activates the indicator for the purposes of an indication of excess edge sharpness.

It is preferable that the apparatus further includes a continuity indicator to provide an indication that electrical continuity has been achieved during a test, thereby indicating excess edge sharpness, the indicator remaining active until reset; and a reset switch is disposed in the continuity circuit for interrupting current flow within the continuity circuit including current to the indicator and maintaining such interruption until continuity is achieved during a sharpness test, thereby preparing the continuity circuit for testing.

Preferably, the apparatus further includes a continuity indicator to provide an indication that electrical continuity has been achieved during a test, thereby indicating excess edge sharpness, the indicator remaining active until reset and a reset switch disposed in the continuity circuit for interrupting current flow within the continuity circuit including current to the indicator and maintaining such interruption until continuity is achieved during a sharpness test, thereby preparing the continuity circuit for testing; and a second indicator providing an indication that the continuity circuit has been reset and is ready for use in testing an edge of a workpiece for sharpness.

It is further preferred that the continuity circuit include a main power switch for electrically disabling the apparatus when not being used for testing an edge of a workpiece for sharpness.

Preferably, the probe is electrically conductive and in electrical communication with both the test head and the continuity circuit. Alternately, the test head may be wired to the continuity circuit.

The present invention also includes a method for testing an edge of a workpiece for sharpness using the present apparatus. The present method includes the steps of providing an apparatus for testing the edge of a workpiece for sharpness including a body; a probe extending outwardly from the body and pivotably mounted thereto, the probe being biased by biasing means in a direction for placement against an edge of a workpiece with a predetermined force; a test head disposed on a distal end of the probe for mounting test tape for physical contact with an edge as a test medium; a test point for connecting to the workpiece; and a continuity circuit mounted to the body in electrical communication with the test head and the test point for providing a predetermined electrical current between the test head and the test point through the workpiece when the test tape is cut sufficiently by the workpiece to allow the test head to touch the workpiece to form a complete circuit and thereby use electrical continuity as an indication of an excess edge sharpness.

The method further includes the steps of applying a plurality of tape members in a layered configuration on the test head in a predetermined manner; and connecting the test point to the workpiece. Next, the method includes the step of applying the tape members on the test head to the edge to be tested by applying a predetermined force using the body, the probe and the biasing means and drawing a stroke of predetermined length across the edge under test.

The next method step includes inspecting the apparatus for an indication that continuity had been achieved wherein the tape was cut by the edge under test sufficiently to make electrical contact between the test head and the workpiece, thereby allowing electrical communication between the test head and the test point via the continuity circuit and the workpiece, and thereby indicating to the user that the edge tested had excess sharpness.

It is preferred that the step of providing an apparatus includes providing such an apparatus with a continuity indicator to provide an indication that electrical continuity has been achieved during a test, thereby indicating excess edge sharpness and the step of inspecting the apparatus includes inspecting the indicator.

It is further preferred that the step of providing an apparatus includes providing a continuity indicator to provide an indication that electrical continuity has been achieved during a test, thereby indicating excess edge sharpness, the indicator remaining active until reset and a reset switch disposed in the continuity circuit for interrupting current flow to the continuity circuit including current to the indicator and maintaining such interruption until continuity is achieved during a sharpness test, thereby preparing the continuity circuit for testing; and the step of inspecting the apparatus includes inspecting the indicator and resetting the continuity circuit using the reset switch in preparation for further use.

Preferably, the step of providing an apparatus includes providing a continuity indicator to provide an indication that electrical continuity has been achieved during a test, thereby indicating excess edge sharpness the indicator remaining active until reset, a reset switch disposed in the continuity circuit for interrupting current flow to the to the continuity circuit including current to the indicator and maintaining such interruption until continuity is achieved during a sharpness test, thereby preparing the continuity circuit for testing; and a second indicator providing an indication that the continuity circuit has been reset and is ready for use in testing an edge of a workpiece for sharpness. It is also preferred that the step of inspecting the apparatus includes inspecting the indicator and resetting the continuity circuit using the reset switch in preparation for further use. The method further preferably comprises the step of inspecting the second indicator for an indication that the continuity circuit has been reset and is ready for use in testing an edge of a workpiece for sharpness.

Preferably the step of providing an apparatus includes providing such an apparatus with an electrically conductive probe in electrical communication with both the continuity circuit and the test head. Alternately, the step of providing an apparatus includes providing such an apparatus with a test head wired to the continuity circuit.

The present invention can also be defines in terms of a carrier, a trip component and a signal generating element. In that manner, the present invention is directed to an apparatus for testing an edge of a workpiece for sharpness, the apparatus including a carrier and a trip component mounted on the carrier. The trip component is deployable against an edge of a workpiece and is also disposable between a trip condition that occurs when the trip component is deployed against an edge of a workpiece, the edge of the workpiece has a predetermined sharpness characteristic, and the predetermined sharpness characteristic of the edge of the workpiece effects a change in the trip component and a non-trip condition that occurs when the trip component is not deployed for testing against an edge of a workpiece and the edge of the workpiece has a predetermined sharpness characteristic.

The present invention also includes a signal generating element, the signal generating element being operatively connected to the trip component. The signal generating element provides an electrical current that, when the trip component is in its trip condition, flows through the signal generating component and the trip component in a complete electrical circuit and the signal generating element operates to generate a signal in response to the flow of electrical current therethrough in a complete electrical circuit.

Preferably, the trap component is in electrical communication with the signal generating element and the signal generating element is in electrical communication with an edge under test such that a complete circuit is formed through the trip component, the signal generating element and the edge under test when the trip component is in its trip condition. It is further preferred that the trip component includes an electrically conductive test head for supporting test tape for physical contact with an edge as a test medium.

The present invention may also include an indicator light operative responsive to a signal generated by the signal generating element. The present invention may also include a reset switch in electrical communication with the indicator light, signal generating element and the trip component operable to effect a change in the trip component from a trip condition to a non-trip condition after the trip component has been used for testing against an edge of a workpiece, and to effect a change in the signal generating element from a signal generating condition to a non-signal generating condition after the signal generating element has been used during an edge sharpness test.

By the above, the present invention provides a simple, objective sharp edge test apparatus that complies with standards set forth in UL 1439.

BRIEF DESCRIPTION OF THE DRAWINGS

FIG. 3 is a partial end view of the test head of the edge test apparatus illustrated in FIG. 1;

FIG. 4 is a flow chart of the method according the preferred embodiment of the present invention.

DESCRIPTION OF THE PREFERRED EMBODIMENT

Figure 1:
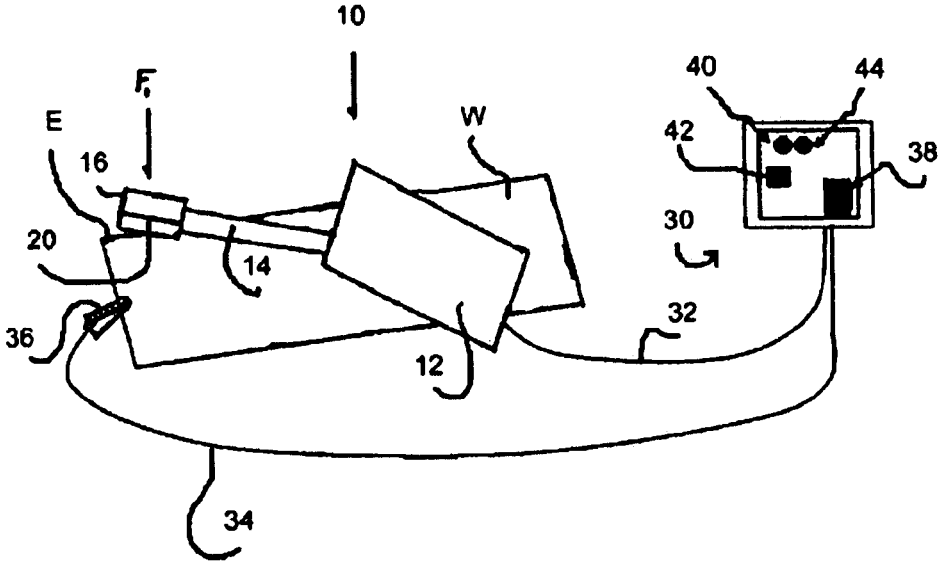
FIG. 1 is a diagrammatic view of an apparatus for testing an edge for sharpness according to the preferred embodiment of the present invention.
Figure 2:
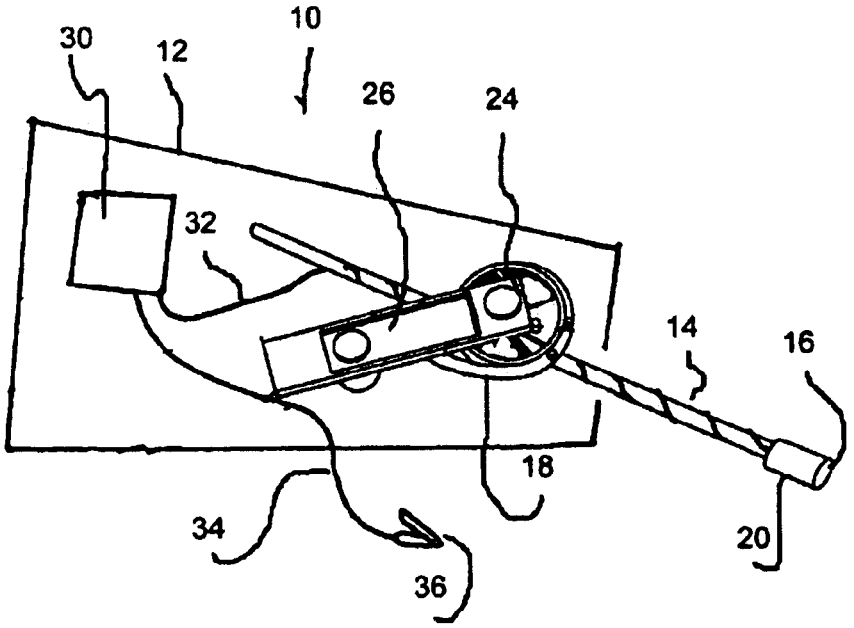
FIG. 2 is a diagrammatic view of the edge test apparatus illustrated in FIG. 1 showing internal components.

Turning now to the drawings and more particularly to the FIGS. 1 and 2, an apparatus for testing the sharpness of an edge of a workpiece is illustrated generally at 10 and includes a carrier such as a housing or body 12. The body 12 may be a clam-shell type housing and it may be molded from plastic, formed from metal or any other structural material that will support the inner workings of the test apparatus 10 as seen in FIG. 2.

Underwriters Laboratories, which is an independent, not-for-profit product safety certification organization that tests products, has promulgated a test for testing edge sharpness in an effort to encourage a uniform standard for edge sharpness. This test for testing edge sharpness promulgated by Underwriters Laboratories is denominated Test For Sharpness Of Edges On Equipment and has been made available as UL Form 1439 ("UL 1439) (ISBN 0-7629-0275-2). UL 1439 is referenced herein as a source of further information concerning one test for testing edge sharpness that the apparatus for testing the sharpness of an edge of a workpiece and the method of the present invention can perform. However, it should be noted that the apparatus for testing the sharpness of an edge of a workpiece and the method of the present invention can perform other tests for testing edge sharpness and the suitability of the apparatus for testing the sharpness of an edge of a workpiece and the method of the present invention for performing tests for testing edge sharpness is in no way restricted to only those tests for testing edge sharpness performed in accordance with the test promulgated by Underwriters Laboratories denominated Test For Sharpness Of Edges On Equipment and available as UL Form 1439 ("UL 1439") (ISBN 0-7629-0275-2).

A probe 14 is rotatably mounted to a probe support 26 which is in turn mounted to the body 12. A biasing arrangement, in this case a spring 18 is wound around a hub 24 which is rotatably mounted to the probe support 26. The probe 14 extends outwardly from the body 12 from its mounted position at the hub 24, such that the probe 14 transmits the biasing influence of the spring 18 to its distal end, for ultimate edge engagement, with a constant downwardly directed force $F_1$ of 1.5 pounds (6.7 N).

The present invention also includes a trip component including a test head 16 provided at the end of the probe 14. The test head 16 is electrically conductive, and the entire probe 14 may be electrically conductive as well. As seen in FIG. 3, an inner layer of sensing tape 22 is provided around approximately one half the outer diameter of the surface of the test head 16. The inner layer is sensing tape number 2, a white vinyl foam tape described in UL 1439 Section 5.1(c). Attached to the inner layer is an outer layer of sensing tape 20, namely, sensing tape number 1, a tetrafluorethylene tape as described in UL 1439 Section 5.1(d).

Returning now to FIG. 1, a continuity circuit 30 which forms all or part of a signal generating element is provided to conduct the sharpness test by determining whether electrical continuity exists between the test head 16 and a test point 36, which may be formed as an alligator clip in electrical communication with the continuity circuit for clipping to the workpiece, via the workpiece W and associated wiring 32, 34. If the tape 20 is sufficiently cut so as to expose the conductive tape head 16 to the edge E of the workpiece W, continuity is achieved and the edge E fails the test. The circuit 30 is shown in FIG. 1 away from the body 12 of the tester 10 for clarity, with wiring 32, 34 shown for completeness of the circuit path, but it will be understood by those skilled in the art that the circuit 30 may be mounted to the body, for example within the clam-shell structure thereof.

It is also well within the skill of one in the ordinary skill of the art to construct a DC continuity circuit of the type described and applied herein with the features described herein. Accordingly, a detailed description of the actual circuit is not warranted here. An on/off switch 38 is provided for main power control. An indicator light 40 is provided to become illuminated when continuity is achieved thereby causing the edge E of the workpiece W to fail the test. Optionally, an audible indicator may be used in place of, or in conjunction with the indicator light 40. A reset switch 42 is provided to reset the continuity circuit in preparation for the next test. In order to inform the user that the tester 10 is ready for the next test, a ready light 44 is provided in the circuit 30. Optionally, an indicator may be used to inform the user that the apparatus is in a proper position for executing the test on an edge of a workpiece. It will be understood by those skilled in the electronic arts that the indicators and switches may be positioned on the outside of the test apparatus 10 for convenient access by a user and need not be mounted directly to the circuit 30 as illustrated generally in FIG. 1.

In order to complete the circuit illustrated in FIG. 1, a main wire 32 extends from the conductive head 16 and, as seen in FIG. 1, through the probe 14 to the circuit 30. In addition, a second conductor 34 is provided between a clip 36 and the circuit 30 with the additional clip 36 being mounted to the workpiece W as a test point so that continuity can be established. As seen in FIG. 2, the wire 32 is wrapped around the probe 14 to ultimately reach the conductive test head 16. Optionally, as seen in FIG. 1, the probe 14 may be electrically conductive itself and in electrical communication with the test head such that the wire around the probe 14 may be omitted. Either technique would provide a workable test apparatus 10.

Turning now to FIG. 4, in conformance with UL 1439 and a preferred embodiment of present invention, the method of the present invention is illustrated generally at 50 in the manner of a flow chart. Initially, the power is turned on to the test apparatus 10 as illustrated at 52. The operator then checks for a system ready light 44 at box 54 and if no light is indicated as seen in box 56, the user presses the reset as seen at box 60 and proceeds with the test. If the system ready light 54 is illuminated, as indicated at box 58, the user proceeds with the test. The test point clip 36 is attached to some portion of the workpiece W so that if continuity is established, current can flow.

Next, the user applies the test apparatus 10 to the edge E under test as seen in FIG. 1, thereby applying constant 1.5 pounds of force. A test apparatus 10 is then immediately moved along the edge E a distance of approximately 2 inches (50.8 millimeters) and then back to its starting position without removal of the test apparatus 10 from the edge E. It is then withdrawn from the edge E. The total distance of engagement between the edge E and the tape covered test head 16 is not to exceed 4 inches (101 mm). The time of travel is to be between two seconds and 5 seconds. That is the test applied at box 64 in FIG. 4 and as discussed in UL 1439 at paragraph 7.4.

Once the test has been performed, the user queries whether current from the test head 16 to test clip 36 exceeded 5 mA, In order to make this assessment, the first indicator light 40 is viewed to determine whether the Edge E has passed or failed the test. If the Edge E has failed the test, in that current from the test head 16 to test clip 36 exceeds 5 mA, as illustrated at 68, the fail indicator 40 illuminates as indicated at 70. If the current is not present and the fail indicator 40 does not illuminate, as illustrated at 72 the edge E has passed the test as illustrated at 74 in FIG. 4.

By the above, the present apparatus and method can be used to determine whether an edge of an industrial workpiece such as an appliance is in compliance with UL standards in an objective and rapid manner. The use of a go/no-go type operational test provides such objectivity and can enhance the consistency of the test results as well as reducing the time necessary to apply the test.

It will therefore be readily understood by those persons skilled in the art that the present invention is susceptible of a broad utility and application. While the present invention is described in all currently foreseeable embodiments, there may be other, unforeseeable embodiments and adaptations of the present invention, as well as variations, modifications and equivalent arrangements, that do not depart from the substance or scope of the present invention. The foregoing disclosure is not intended or to be construed to limit the present invention or otherwise to exclude such other embodiments, adaptations, variations, modifications and equivalent arrangements, the present invention being limited only by the claims appended hereto and the equivalents thereof.

What is claimed is:

1. An apparatus for testing an edge of a workpiece for sharpness comprising:

a body;

a probe extending outwardly from the body and pivotably mounted thereto, the probe being biased by biasing means in a direction for placement against an edge of a workpiece with a predetermined force;

a test head disposed on a distal end of the probe for mounting test tape for physical contact with an edge as a test medium;

a test point for mounting to the workpiece; and a continuity circuit mounted to the body in electrical communication with the test head and the test point for providing a predetermined electrical current between the test head and the test point through the workpiece when the test tape is cut sufficiently by the workpiece to allow the test head to touch the workpiece to form a complete circuit and thereby use electrical continuity as an indication of an excess of edge sharpness.

2. An apparatus for testing an edge of a workpiece for sharpness according to claim 1 and further comprising a continuity indicator to provide an indication that electrical continuity has been achieved during a test, thereby indicating excess edge sharpness.

3. An apparatus for testing an edge of a workpiece for sharpness according to claim 1 wherein the continuity circuit is configured such that a current of 5 mA is considered continuity for the purposes of an indication of excess sharpness of the edge.

4. An apparatus for testing an edge of a workpiece for sharpness according to claim 2 wherein the continuity circuit is configured such that a continuous current of 5 mA activates the indicator for the purposes of an indication of excess sharpness of the edge.

5. An apparatus for testing an edge of a workpiece for sharpness according to claim 1 and further comprising a continuity indicator to provide an indication that electrical continuity has been achieved during a test, thereby indicating excess edge sharpness, the indicator remaining active until reset and a reset switch disposed in the continuity circuit for interrupting current flow within the continuity circuit including current to the indicator and maintaining such interruption until continuity is achieved during a sharpness test, thereby preparing the continuity circuit for testing.

6. An apparatus for testing an edge of a workpiece for sharpness according to claim 5 and further comprising a continuity indicator to provide an indication that electrical continuity has been achieved during a test, thereby indicating excess edge sharpness, the indicator remaining active until reset and a reset switch disposed in the continuity circuit for interrupting current flow within the continuity circuit including current to the indicator and maintaining such interruption until continuity is achieved during a sharpness test, thereby preparing the continuity circuit for testing; and a second indicator providing an indication that the continuity circuit has been reset and is ready for use in testing an edge of a workpiece for sharpness.

7. An apparatus for testing an edge of a workpiece for sharpness according to claim 1 wherein the continuity circuit includes a main power switch for electrically disabling the apparatus when not being used for testing an edge of a workpiece for sharpness.

8. An apparatus for testing an edge of a workpiece for sharpness according to claim 1 wherein the probe is electrically conductive and in electrical communication with both the test head and the continuity circuit.

9. An apparatus for testing an edge of a workpiece for sharpness according to claim 1 wherein the test head is wired to the continuity circuit.

10. A method for testing an edge of a workpiece for sharpness comprising the steps of:

providing an apparatus for testing the edge of a workpiece for sharpness including:

a body;

a probe extending outwardly from the body and pivotably mounted thereto, the probe being biased by biasing means in a direction for placement against an edge of a workpiece with a predetermined force;

a test head disposed on a distal end of the probe for mounting test tape for physical contact with an edge as a test medium;

a test point for connecting to the workpiece; and a continuity circuit mounted to the body in electrical communication with the test head and the test point for providing a predetermined electrical current between the test head and the test point through the workpiece when the test tape is cut sufficiently by the workpiece to allow the test head to touch the workpiece to form a complete circuit and thereby use electrical continuity as an indication of an excess edge sharpness;

applying a plurality of tape members in a layered configuration on the test head in a predetermined manner;

connecting the test point to the workpiece;

applying the tape members on the test head to the edge to be tested in by applying a predetermined force using the body, the probe and the biasing means and drawing a stroke of predetermined length across the edge under test;

inspecting the apparatus for an indication that continuity had been achieved wherein the tape was cut by the edge under test sufficiently to make electrical contact between the test head and the workpiece, thereby allowing electrical communication between the test head and the test point via the continuity circuit and the workpiece, and thereby indicating to the user that the edge tested had excess sharpness.

11. A method for testing an edge of a workpiece for sharpness according to claim 10 wherein the step of providing an apparatus includes providing such an apparatus with a continuity indicator to provide an indication that electrical continuity has been achieved during a test, thereby indicating excess edge sharpness; and the step of inspecting the apparatus includes inspecting the indicator.

12. A method for testing an edge of a workpiece for sharpness according to claim 10 wherein the step of providing an apparatus includes providing a continuity indicator to provide an indication that electrical continuity has been achieved during a test, thereby indicating excess sharpness, the indicator remaining active until reset and a reset switch disposed in the continuity circuit for interrupting current flow to the continuity circuit including current to the indicator and maintaining such interruption until continuity is achieved during a sharpness test, thereby preparing the continuity circuit for testing and; the step of inspecting the apparatus includes inspecting the indicator and resetting the continuity circuit using the reset switch in preparation for further use.

13. A method for testing an edge of a workpiece for sharpness according to claim 10 wherein the step of providing an apparatus includes providing a continuity indicator to provide an indication that electrical continuity has been achieved during a test, thereby indicating excess edge sharpness the indicator remaining active until reset, a reset switch disposed in the continuity circuit for interrupting current flow to the to the continuity circuit including current to the indicator and maintaining such interruption until continuity is achieved during a sharpness test, thereby preparing the continuity circuit for testing, and a second indicator providing an indication that the continuity circuit has been reset and is ready for use in testing an edge of a workpiece for sharpness; and the step of inspecting the apparatus includes inspecting the indicator and resetting the continuity circuit using the reset switch in preparation for further use; and wherein the method further comprises the step of inspecting the second indicator for an indication that the continuity circuit has been reset and is ready for use in testing an edge of a workpiece for sharpness.

14. A method for testing an edge of a workpiece for sharpness according to claim 10 wherein the step of providing an apparatus includes providing such an apparatus with an electrically conductive probe in electrical communication with both the continuity circuit and the test head.

15. A method for testing an edge of a workpiece for sharpness according to claim 10 wherein the step of providing an apparatus includes providing such an apparatus with a test head wired to the continuity circuit.

16. An apparatus for testing an edge of a workpiece for sharpness, the apparatus comprising:

a carrier;

a trip component mounted on the carrier, the trip component being deployable against an edge of a workpiece and the trip component being disposable between a trip condition that occurs when the trip component is deployed against an edge of a workpiece, the edge of the workpiece has a predetermined sharpness characteristic, and the predetermined sharpness characteristic of the edge of the workpiece effects a change in the trip component and a non-trip condition that occurs when the trip component is not deployed for testing against an edge of a workpiece and the edge of the workpiece has a predetermined sharpness characteristic; and a signal generating element, the signal generating element being operatively connected to the trip component, the signal generating element providing an electrical current that, when the trip component is in its trip condition, flows through the signal generating component and the trip component in a complete electrical circuit and the signal generating element operating to generate a signal in response to the flow of electrical current therethrough in a complete electrical circuit.

17. An apparatus for testing an edge of a workpiece for sharpness according to claim 16, wherein, during a test of an edge of a workpiece, the trip component is in electrical communication with the signal generating element and the signal generating element is in electrical communication with the workpiece such that a complete circuit is formed through the trip component, the signal generating element, and the workpiece when the trip component is in its trip condition.

18. An apparatus for testing an edge of a workpiece for sharpness according to claim 17, wherein the trip component includes an electrically conductive test head for supporting a test tape for physical contact with an edge of a workpiece as a test medium.

19. An apparatus for testing an edge of a workpiece for sharpness according to claim 10 and further comprising an indicator light operative responsive to a signal generated by the signal generating element.

20. An apparatus for testing an edge of a workpiece for sharpness according to claim 10 and further comprising a reset switch in electrical communication with the indicator light, signal generating element and the trip component operable to effect a change in the trip component from a trip condition to a non-trip condition after the trip component has been used for testing against an edge of a workpiece, and to effect a change in the signal generating element from a signal generating condition to a non-signal generating condition after the signal generating element has been used during an edge sharpness test.

* * * * *